United States Patent
Montoya

(10) Patent No.: US 6,400,943 B1
(45) Date of Patent: Jun. 4, 2002

(54) METHOD AND APPARATUS FOR USING ADVANCED POSITIONING SYSTEMS IN CELLULAR COMMUNICATION NETWORKS

(75) Inventor: Alexander John Montoya, Richardson, TX (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/350,508

(22) Filed: Jul. 9, 1999

Related U.S. Application Data

(62) Division of application No. 08/792,771, filed on Feb. 3, 1997, now Pat. No. 5,983,109.

(51) Int. Cl.$^7$ .............................. H04Q 7/20; H04Q 7/34
(52) U.S. Cl. ...................... 455/426; 455/456; 455/422; 455/436; 455/423; 455/67.1; 455/424; 342/357.01; 342/357.02
(58) Field of Search .................... 455/426, 423, 455/424, 425, 403, 432, 433, 434, 435, 436, 437, 438, 422, 456, 404, 567, 458, 67.1, 67.4, 412, 457, 517; 342/357.01, 357.02, 357.07

(56) References Cited

U.S. PATENT DOCUMENTS

| | | | |
|---|---|---|---|
| 5,153,902 A | 10/1992 | Buhl et al. .................... 455/432 |
| 5,235,633 A | 8/1993 | Dennison et al. ............. 379/60 |
| 5,299,132 A | 3/1994 | Wortham ..................... 455/426 |
| 5,334,974 A | 8/1994 | Simms et al. ................ 455/426 |
| 5,365,450 A | 11/1994 | Schuchman et al. ........ 455/433 |
| 5,369,681 A | 11/1994 | Boudreau et al. ........... 455/426 |
| 5,408,683 A | 4/1995 | Ablay et al. ................. 455/422 |
| 5,418,537 A | 5/1995 | Bird ............................ 455/422 |
| 5,432,841 A | 7/1995 | Rimer ......................... 455/403 |
| 5,479,482 A | 12/1995 | Grimes ....................... 455/422 |
| 5,485,463 A | 1/1996 | Godoroja .................... 455/403 |
| 5,515,419 A | 5/1996 | Sheffer ....................... 455/422 |
| 5,524,136 A | 6/1996 | Bar-Noy et al. ............. 455/403 |
| 5,546,445 A | 8/1996 | Dennison et al. ........... 455/426 |

(List continued on next page.)

FOREIGN PATENT DOCUMENTS

| | | |
|---|---|---|
| GB | 2239758 A | 7/1991 |
| GB | 2271486 A | 4/1994 |
| GB | 2271486 A | 4/1994 |
| GB | 23348582 A | 9/1999 |
| WO | WO 93/13618 A1 | 7/1993 |
| WO | WO 94/01978 | 1/1994 |
| WO | WO 94/07337 A1 | 3/1994 |
| WO | WO 94/27398 | 11/1994 |
| WO | WO 97/07337 | 2/1997 |
| WO | WO 97/09837 A2 | 3/1997 |
| WO | WO 97/09837 | 3/1997 |
| WO | WO 97/50274 | 12/1997 |
| WO | WO 97/50274 A1 | 12/1997 |

*Primary Examiner*—William Trost
*Assistant Examiner*—Keith Ferguson
(74) *Attorney, Agent, or Firm*—Haynes and Boone, LLP

(57) ABSTRACT

A system and method that uses an advanced positioning system in combination with a cellular communication network to improve the performance of the network is disclosed One embodiment of the network includes a mobile switching center (MSC), a location tracker system (LTS), and a plurality of base stations for serving at least one mobile unit in the network. The LTS is able to receive a location code from the mobile unit that represents a specific coordinate, or location, in the network. The mobile unit may have generated the location code by analyzing its position from a global positioning satellite, or by other means. The LTS stores the location code in a data base. Whenever the MSC needs to communicate with the mobile unit, it queries the database of the LTS to determine the last location of the mobile unit. The MSC then selects one of the base stations that serves the location of the mobile unit and establishes a cellular link therethrough.

14 Claims, 3 Drawing Sheets

U.S. PATENT DOCUMENTS

| | | | |
|---|---|---|---|
| 5,559,520 A | 9/1996 | Barzegar et al. | 455/403 |
| 5,566,225 A | 10/1996 | Haas | 455/426 |
| 5,572,204 A | 11/1996 | Timm et al. | 455/426 |
| 5,613,199 A | 3/1997 | Yahagi | 455/403 |
| 5,619,552 A | 4/1997 | Karppanen et al. | 455/403 |
| 5,732,354 A | 3/1998 | MacDonald | 455/403 |
| 5,734,981 A | 3/1998 | Kennedy, III et al. | 455/403 |
| 5,758,264 A | 5/1998 | Bonta et al. | 455/436 |
| 5,815,538 A | 9/1998 | Grell et al. | 455/432 |
| 5,815,814 A | 9/1998 | Dennison et al. | 455/426 |
| RE35,916 E | 10/1998 | Dennison et al. | 455/432 |
| 5,822,694 A | 10/1998 | Coombes et al. | 455/432 |
| 5,842,132 A | 11/1998 | Fukutomi | 455/426 |
| 5,889,770 A | 3/1999 | Jokiaho et al. | 455/436 |
| 5,913,170 A | 6/1999 | Wortham | 455/435 |
| 5,946,626 A | 8/1999 | Foladare et al. | 455/432 |
| 5,960,341 A | 9/1999 | LeBlanc et al. | 455/432 |
| 5,960,356 A | 9/1999 | Alperovich et al. | 455/432 |
| 5,966,662 A | 10/1999 | Murto | 455/432 |
| 5,983,109 A | 11/1999 | Montoya | 455/403 |
| 6,023,624 A | 2/2000 | Hanson | 455/403 |
| 6,052,598 A | 4/2000 | Rudrapatna et al. | 455/403 |
| 6,058,308 A | 5/2000 | Kallin et al. | 455/435 |
| 6,115,611 A | 9/2000 | Kimoto et al. | 455/436 |

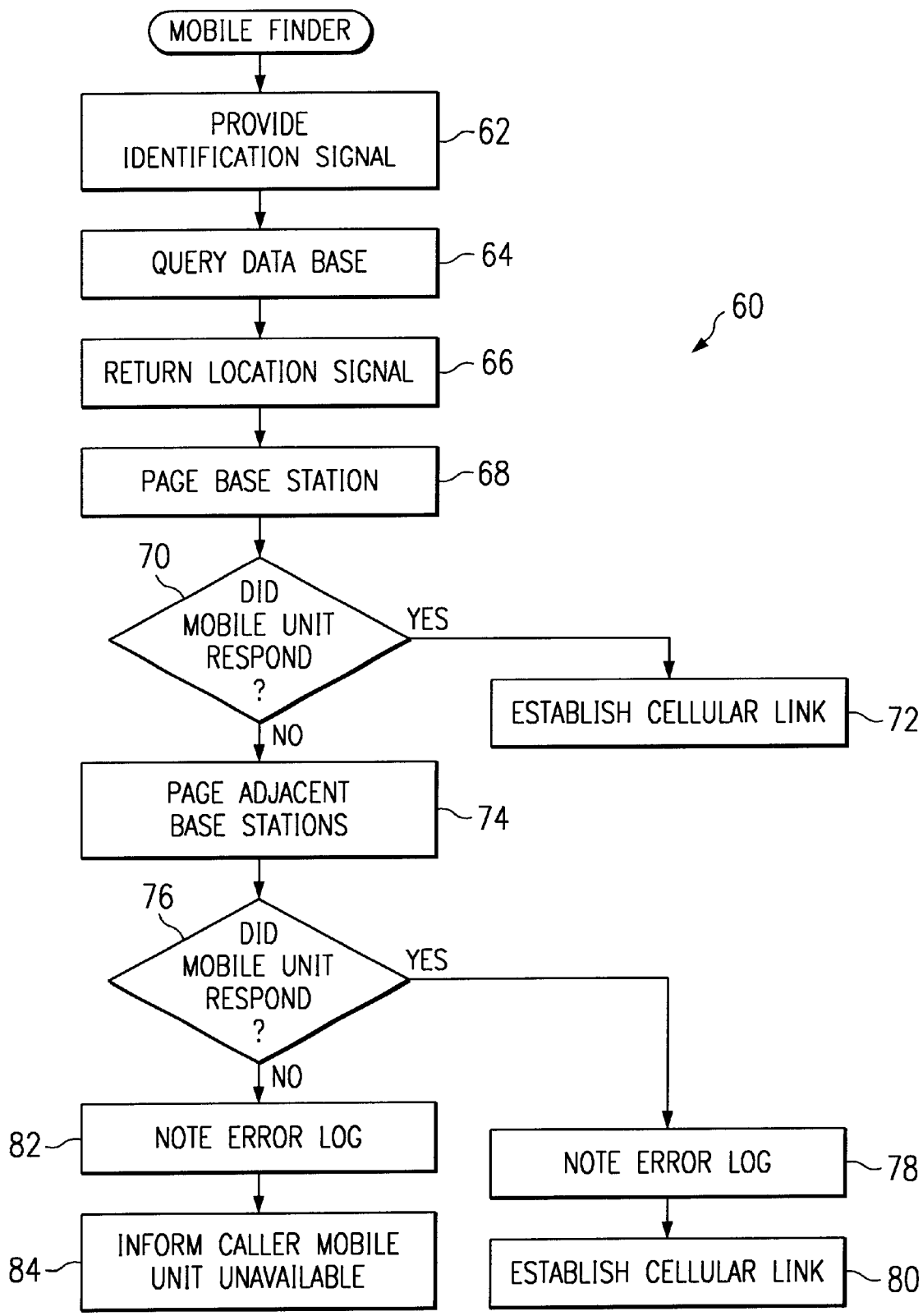

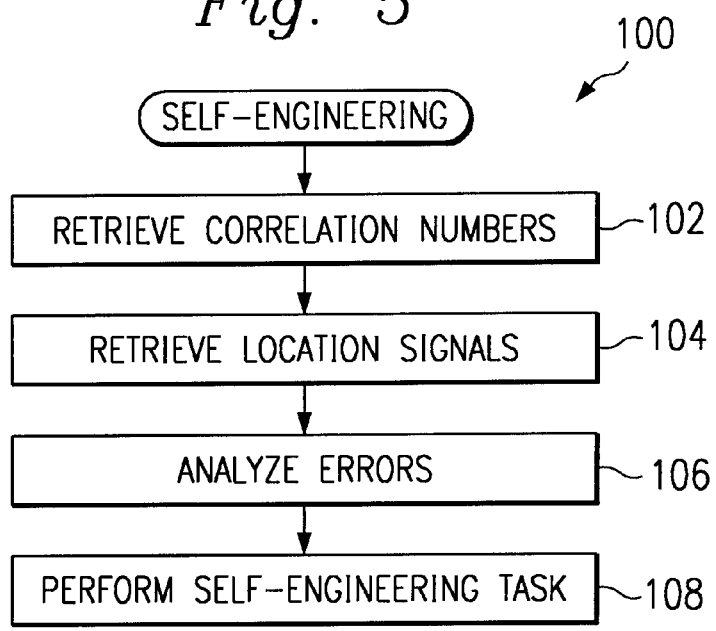
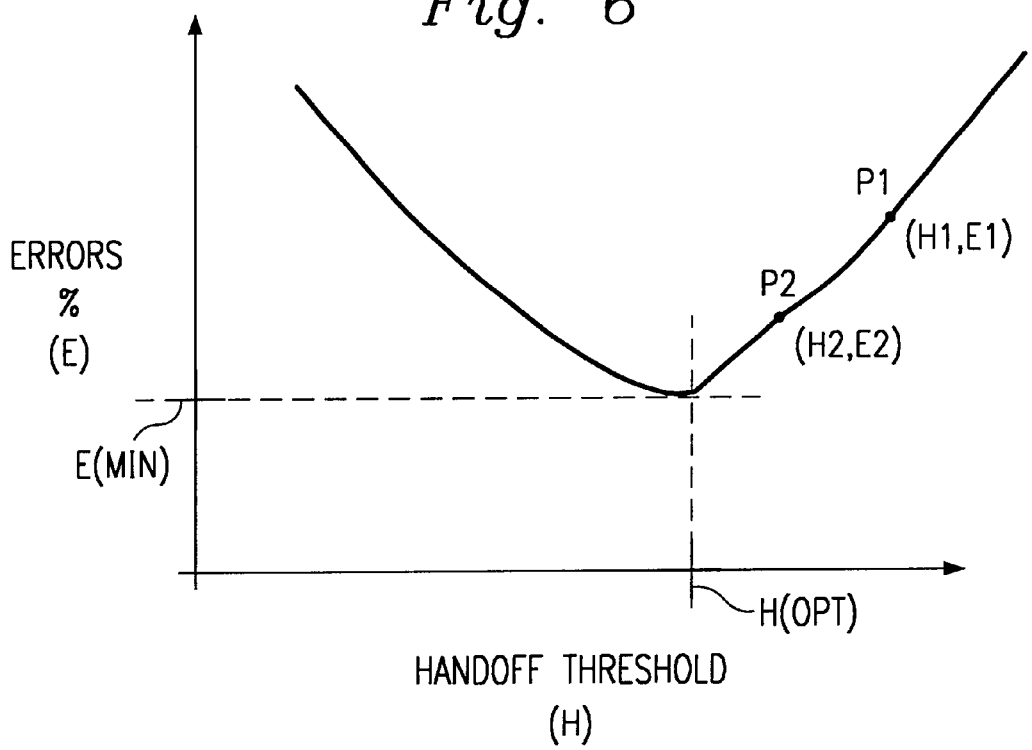

under the new number.
METHOD AND APPARATUS FOR USING ADVANCED POSITIONING SYSTEMS IN CELLULAR COMMUNICATION NETWORKS This is a divisional of U.S. Ser. No. 08/792,771 filed Feb. 3, 1997, now U.S. Pat. No. 5,983,109.

TECHNICAL FIELD

This invention relates generally to cellular communication networks, and in particular, to the utilization of an advanced positioning system in combination with a cellular communication network for improving the performance of the network.

BACKGROUND OF THE INVENTION

The cellular communications industry has experienced very rapid growth in both the areas serviced and the number of subscribers. It is not uncommon in many metropolitan areas for mobile switching centers (MSCs) to have service requests numbering in excess of 100,000 call attempts per hour. In these metropolitan areas, each MSC may serve a network of 100 or more cell sites, or base stations, each of which defines a particular cell. Each MSC also keeps track of all mobile units, such as cellular telephones, currently operating in its service area via a database commonly referred to as a visitor location register (VLR). This register stores information regarding the services available to each subscriber, his home MSC and the current status (e.g., active or inactive) of the mobile unit. The MSC, however, does not usually have accurate information regarding the precise geographical location of each of the mobile units within the service area. Consequently, when a call is initiated to a mobile unit believed to be within the service area, a page must be broadcast over a forward control channel to all cells in the service area. When the mobile unit responds to the page, the particular cell containing the mobile unit is then identified from a reverse control channel used for the mobile response and a cellular link is then set up. In the event there is no response to the page, the system assumes that the mobile unit is currently inactive and the call is treated accordingly.

In order to broadcast a page over the forward control channels of all the base stations in a typical metropolitan system including an MSC serving 100 base stations, the page must be replicated 100 times and a copy sent to each of the 100 base station. As only one base station in the system can respond to the page, the vast majority of the pages are unnecessary, as they will result in no reply whatsoever. These unnecessary pages are produced at the expense of the MSC being available for performing other tasks. Hence, the overall system performance is degraded by the overhead required for the generation of unnecessary pages.

Various approaches have been suggested for overcoming this problem. In one such approach, the cellular network is partitioned into several location areas, each location area including a group of the cells covered by the MSC. Every time a mobile unit leaves one location area and enters another location area, it registers a location update that indicates the mobile unit is a visitor from the location area in which the mobile unit is registered. As a result, should a call be initiated to that mobile unit, the page needs to be sent only to the cells in the location area where the mobile unit is "visiting," thereby reducing system overhead associated with paging that particular mobile unit.

Another approach, discussed in pending patent application Ser. No. 08/743,689 filed on Nov. 6, 1996 and entitled "Method for Reducing Paging Load in a Cellular Communication System", the entire contents of which is herein incorporated by reference, is known as zone paging. In this approach, a two dimensional array referred to as a Location Accuracy Matrix (LAM) is developed. Each entry $(i, j)$ in the LAM represents the number of page responses received from mobile units in cell j when the last known location of each of the mobile units was in cell i. The LAM data is then used to develop a probability matrix $(p(i, j))$ that indicates the probability that a mobile unit is in cell j given the fact that its last known location was in cell i. The zone used for paging a mobile unit the last known location of which was in cell i is all the cells j for which the probability $p(i, j)>0.001$. In the event that this selective zone page is unsuccessful, then all cells in the service area are paged in an attempt to locate the mobile unit. If the all zone page is unsuccessful, the mobile unit is presumed to be turned off.

Although the above-described approaches do reduce the number of pages required to find the cell in which a mobile unit is located, further reductions in the number of cells paged would directly benefit the operation of the MSC. Therefore, what is needed is a system that, with a relatively high level of certainty, only requires a single cell to be paged.

In addition to dealing with paging overhead, the MSC, in conjunction with its base stations, must accommodate the unique radio frequency (RF) characteristics of individual cells in its service area. For example, as a mobile unit moves about within a cell, certain areas of the cell may have obstructions or changes in environment that cause the mobile unit to lose contact with the base station. Such obstructions may be caused by a new building or new billboards that adversely affect the cellular link between the mobile unit and the base station. In addition, such obstructions may interfere with the handoff process when the mobile unit moves from one cell to another. Typically, the location at which the handoff occurs, that is, the "handoff threshold", is the midpoint between the two base stations involved. In actuality, however, the optimal handoff threshold is subject to the unique RF characteristics of each cell and can be affected by changes in the environment.

Therefore, what is needed is a system that automatically reacts to environmental changes in a dynamic service area to consistently provide the best service possible and to provide notification when changes in the environment require extra attention.

In addition, recent governmental regulations require service providers to be able to locate a mobile unit to within 125 meters.

SUMMARY OF THE INVENTION

The foregoing problems are solved and a technical advance is achieved by a system and method that uses an advanced positioning system in combination with a cellular communication network to improve the performance of the network. One embodiment of the network includes a mobile switching center (MSC), a location tracker system (LTS), and a plurality of base stations for serving at least one mobile unit in the network. The LTS is able to receive a location code from the mobile unit that represents a specific geographic location in the network. The mobile unit may have generated the location code by analyzing its position from a global positioning satellite, or other means such as a land-based triangulation device. The LTS stores the location code in a data base. Whenever the MSC needs to communicate with the mobile unit, it queries the database of the LTS to determine the last location of the mobile unit. The MSC then selects one of the base stations that serves the retrieved location of and thereby establishes the cellular link with the mobile unit.

In another embodiment, the MSC is also capable of performing self-engineering. The MSC does this by analyzing the cellular link that it sought to establish with the mobile unit, as compared with the retrieved location. As a result, the MSC is able to perform many different self-engineering activities, such as locating a weak area of the network or improving a handoff threshold between two cells.

A technical advantage achieved with the invention is that the MSC utilizes a single base station to establish a cellular link with the mobile unit with a relatively high level of certainty.

Another technical advantage achieved with the invention is that the MSC reacts to a dynamic service area to consistently provide the best service possible and to provide notification when changes in the environment require extra attention.

BRIEF DESCRIPTION OF THE DRAWINGS

FIG. 4 is a flowchart of a mobile finder process performed by a mobile switching center of the cellular communication network of FIG. 1.

FIG. 5 is a flowchart of a self-engineering process performed by the mobile switching center of FIG. 1.

FIG. 6 is a graph representing analysis performed by the self-engineering process of FIG. 5.

DESCRIPTION OF THE PREFERRED EMBODIMENT

Figure 1:
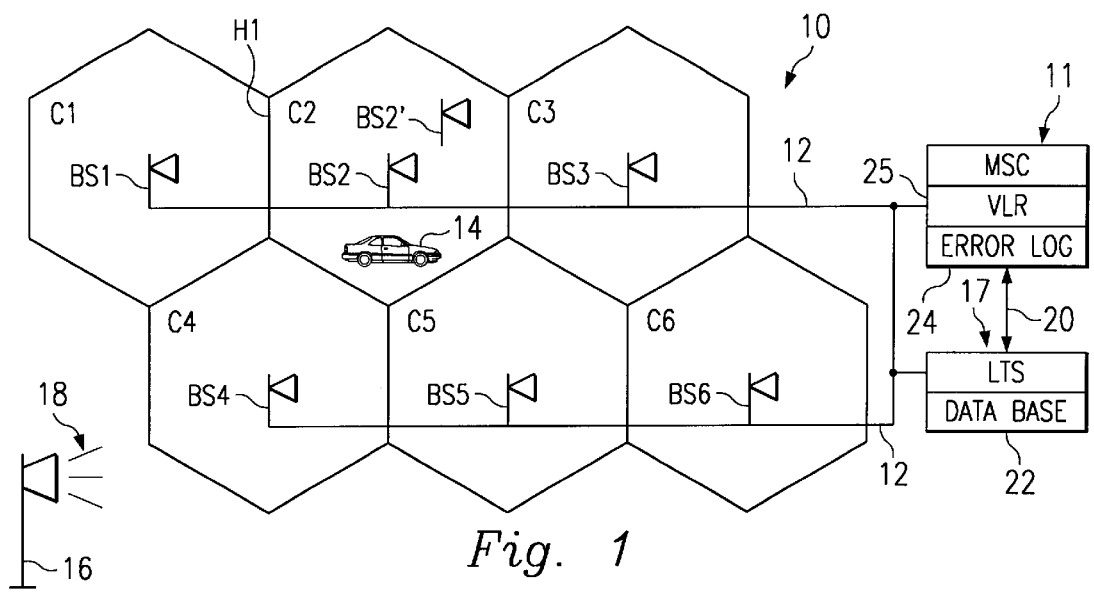
FIG. 1 illustrates an exemplary cellular communication network.

Referring to FIG. 1, the reference numeral 10 designates a simplified cellular communication network operating on a common frequency. The cellular communication network 10 includes many different code division multiple access (CDMA) cells, represented by cells C1, C2, C3, C4, C5 and C6. Each cell C1, C2, C3, C4, C5 and C6 is served by a base station BS1, BS2, BS3, BS4, BS5, and BS6, respectively. All of the base stations BS1, BS2, BS3, BS4, BS5, and BS6 are connected to a mobile switching center ("MSC") 11 via a communication link 12. In the illustrated embodiment, a mobile unit 14 is located inside cell C2. A cellular link represents communication between the mobile unit 14 and the MSC 11 via a radio frequency (RF) link between the mobile unit 14 and one of the base stations BS1, BS2, BS3, BS4, BS5, and BS6, and the communication link 12. It is understood, however, that the cellular communication network may represent any number of cells connected by one or more different communication links and simultaneously communicating with many mobile units, such as the mobile unit 14. In addition, the cellular communication network 10 may utilize different technologies, such as advanced mobile phone service (AMPS) or time division multiple access (TDMA).

The cellular communication network 10 also utilizes two additional systems. An advanced positioning system 16 is located so that positioning signals 18 are accessible by the mobile unit 14. For example, the advanced positioning system 16 may include one or more global positioning satellites (GPS) (not shown).

In accordance with features of the present invention, a location tracker system ("LTS") 17 is also included in the cellular communication network 10. The LTS 17 is a computer capable of interfacing with the MSC 11 and the base stations BS1, BS2, BS3, BS4, BS5, and BS6. For the sake of example, the LTS 17 is shown in FIG. 1 as interfacing the base stations BS1, BS2, BS3, BS4, BS5, and BS6 through the communication link 12 and interfacing with the MSC 11 via a bus 20. The bus 20 uses a conventional messaging scheme such as SS7, X.25, or ISDN. As will subsequently be described in detail, the LTS 17 includes a database 22 for storing certain information for the mobile unit 14. The MSC 11 also includes an error log 24 for storing error information and a visitor location register ("VLR") 25, as described in greater detail below.

Figure 2:
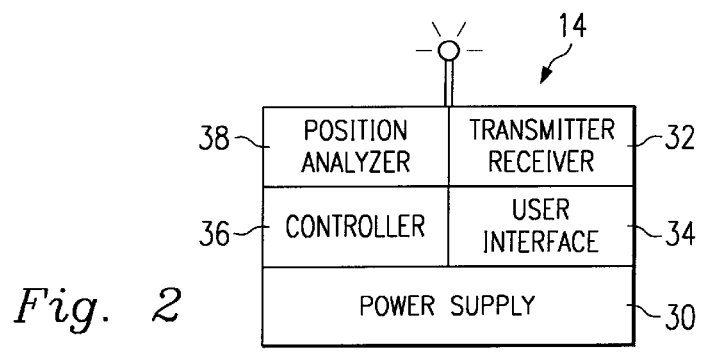
FIG. 2 is a block diagram of a mobile unit for use in the cellular communication network of FIG. 1.

Referring also to FIG. 2, the mobile unit 14 includes a conventional power supply 30, a transmitter/receiver ("T/R") 32 and a user interface 34. The power supply 30 can selectively place the mobile unit 14 in an "off" state, in which no power is used by the mobile unit, an "on" state, in which power is supplied to all components of the mobile unit, and a "standby" state, in which power is only supplied to some components, but in which the mobile unit is capable of receiving and replying to messages from the MSC 11.

The mobile unit 14 also includes a controller 36 and a position analyzer 38. The controller 36 manages many of the conventional functions of the mobile unit 14. In addition, the controller 36 works with the position analyzer 38 and the T/R 32 to receive and analyze the position signal 18 and transmit a location code to the base station serving the cell in which the mobile unite 14 is located, in this case, base station BS2. The location code may be a geographic coordinate (e.g. latitude, longitude, altitude, and time offset) or some other location identifier, as discussed in greater detail below.

Figure 3A:
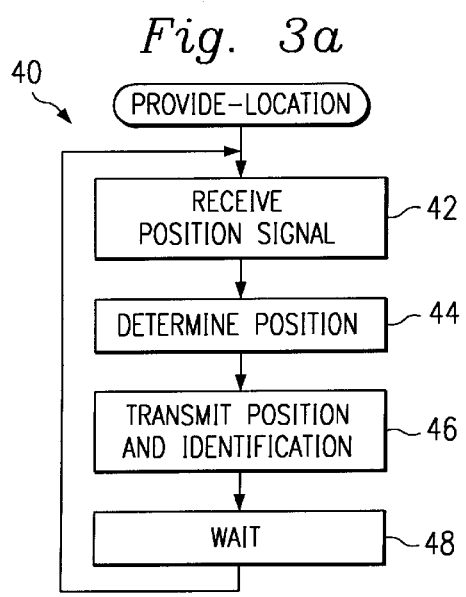
FIG. 3a is a flowchart of a provide-location process performed by the mobile unit of FIG. 2.

Referring also to FIG. 3a, when the mobile unit 14 is in either the on or standby state, it performs a provide location process 40. At step 42, the T/R 32 receives the positioning signal 18 from the advanced positioning system 16 and provides the signal to the position analyzer 38 of the mobile unit 14. At step 44, the position analyzer 38 analyzes the positioning signal 18, determines the location of the mobile unit 14 (e.g., a coordinate), and provides the location, in the form of a signal or code, to the T/R 32. At step 46, the T/R 32 broadcasts the location code, along with an identification code identifying the mobile unit 14, to the base station BS2 through the RF link therebetween (not shown). The identification code corresponds to a similar code identifying the mobile unit 14 stored in the VLR 25 of the MSC 11. At step 48, the mobile unit 14 waits a predetermined amount of time (e.g. a few minutes, as required by cell size and traffic patterns) before it repeats the process 40.

Whenever the base station BS2 receives the location and identification codes from the mobile unit 14, it transmits them to the LTS 17 through the communication link 12. The LTS 17 stores the location and identification codes in the database 22.

Figure 3B:
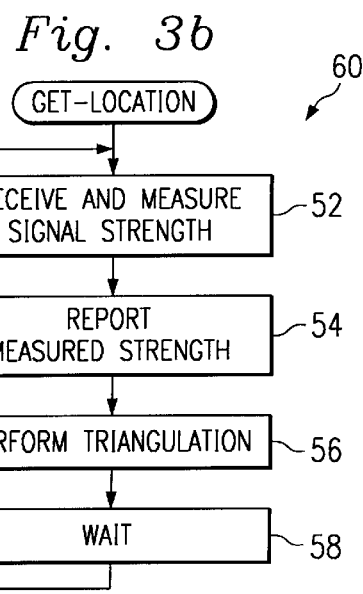
FIG. 3b is a flowchart of a get-location process performed by a location tracking system of FIG. 1.

Referring also to FIG. 3b, alternatively, if the position analyzer 38 is not included in the mobile unit 14, the LTS 17 can obtain location information by using a get location process 50. At step 52, the base stations BS2, BS4, and BS5 receive and measure the strength of a signal from the mobile unit 14. At step 54, the base stations BS2, BS4, and BS5 report the measured signal strength, along with an identification code, to the LTS 17. At step 56, the LTS 17 deduces the location of mobile unit 14 through triangulation. At step 58, the base stations BS2, BS4, and BS5 wait a predetermined amount of time before they repeat the process 50. As in the provide location process 40, the LTS 17 stores the location and identification codes in the database 22.

Referring also to FIG. 4, whenever the MSC 11 needs to communicate with the mobile unit 14, for example, to issue a page to initiate a cellular link with the mobile unit, the MSC 11 first performs a mobile finder process 60. At step 62, the MSC 11 consults the VLR 25 and determines the identification code that corresponds to the mobile unit 14 and then provides the corresponding identification code to the LTS 17. At step 64, the LTS 17 queries the database 22 to retrieve the location code that corresponds to the identification code. At step 66, the LTS 17 returns the corresponding location code to the MSC 11. At step 68, the MSC 11 pages only one base station, i.e., the base station that serves the location identified by the location code. In the present example, base station BS2 is paged.

At step 70, a determination is made as to whether the mobile unit 14 responded to the page from the base station BS2. If so, execution proceeds to step 72 and a conventional cellular link is established between the mobile unit 14 and the MSC 11 through the base station BS2. If, however, the mobile unit 14 did not respond to the page, then execution proceeds to step 74. At step 74, the base stations BS1, BS3, BS4, and BS5, which are adjacent to BS2, are all simultaneously paged. At step 76, a determination is made as to whether the mobile unit 14 responded to the page from one of the base stations BS1, BS3, BS4, and BS5. If so, execution proceeds to step 78 where the error log 24 of the MSC 11 records a first correlation number (e.g. a time reading), the identity of the base station that was originally paged (e.g. base station BS2), and which of the adjacent base stations picked up the response from the mobile unit 14 (e.g. base station BS1). At step 80, which may occur simultaneously with step 78, a conventional cellular link is established between the mobile unit 14 and the MSC 11 through the base station that picked up the response from the mobile unit.

If at step 76 a determination is made that the mobile unit 14 did not respond to the page, execution proceeds to step 82. At step 82, the error log 24 of the MSC 11 records a second correlation number, the identity of the base station that was originally paged (e.g., base station BS2), and an uncompleted cellular link indicator. At step 84, which may occur simultaneously with step 82, the caller attempting to reach the mobile unit 14 is informed that the mobile unit is unavailable.

In addition to determining the appropriate base station with which to signal the mobile unit 14, the LTS 17 can be used to facilitate an "overlay" of technologies. For example, a base station BS2' may be co-located with the base station BS2 in the cell C2. The base station BS2' utilizes AMPS technology while the base station BS2 utilizes CDMA technology. When the MSC 11 wants to page the mobile unit 14, it would potentially have to transmit page signals on both base stations BS2 and BS2'. However, the LTS 17 facilitates storing a technology code along with the location code. As a result, the MSC 11 will also be informed of the technology that the mobile unit 14 is using and may thereby select the appropriate base station.

Referring to FIG. 5, the MSC 11 periodically performs a self-engineering process 100. The process begins at step 102, at which the MSC 11 retrieves selected correlation numbers (e.g. time and position) from the error log 24. At step 104, the correlation numbers retrieved at step 102 are provided to the LTS 17, which retrieves the corresponding location codes from the database 22. At step 106, the MSC 11 analyzes the errors, along with the corresponding locations codes. At step 108, the MSC 11 makes any self-engineering adjustments or notifications, as required. Examples of such self-engineering adjustments or notifications are described below.

Referring also to FIG. 6, the self-engineering process 100 can be a real-time process for determining the optimal handoff threshold for performing a handoff from cell C2 to cell C1 will be described. Initially, the handoff threshold, i.e. the distance from the base station BS2 when handoff occurs to base station BS1, is a distance H1 (FIG. 1). Although the distance H1 represents the geographical midpoint between the base stations BS2 and BS1, it may not be the optimal handoff threshold due to the unique RF characteristics of the cells C2 and C1.

At step 102, the MSC 11 retrieves the correlation numbers that pertain to hand-offs from the cell C2 to cell C1, such as the first and second correlation numbers described above. At step 106, the MSC 11 compares the correlation numbers with the total number of attempted hand-offs from cell C2 to cell C1 to produce a data point P1. The data point P1 indicates an error percentage E1, which represents the rate of failed hand-offs, when the handoff threshold is at the distance H1. In an effort to reduce the rate of failed hand-offs at step 108 the MSC 11 informs the base station BS2 to decrease its handoff threshold to a new distance H2. Therefore, when the self-engineering process 100 runs a second time, it produces a data point P2 that indicates a second error percentage E2.

Eventually, as the self-engineering process 100 continues to run, an acceptable error percentage E(min) will be achieved and an optimal handoff threshold H(opt) will be determined. Furthermore, the optimal handoff threshold H(opt) will be dynamic. That is, if the optimal handoff threshold H(opt) were to change due to changes in the environment (e.g., several new billboards are erected near the cell C2/cell C1 border), the self-engineering process 100 will recalculate and adjust the optimal handoff threshold H(opt) accordingly. Alternatively, if the acceptable error percentage E(min) is not achieved, the self-engineering process 100 can notify appropriate personnel by setting an alarm. It is understood that in addition to determining the optimal handoff threshold H(opt) between the two CDMA cells C2 and C1, the self-engineering process 100 can be used to determine the optimal handoff from or to overlaid cells.

Determining the optimal handoff location between two cells is only one of the self-engineering processes that can be utilized. Another such process can be used to determine a RF map of each cell, thereby pin-pointing weak points in each cell. As a result, when some new event, such as a newly erected building, changes the RF map of a cell, the MSC 11 becomes aware of the change and can implement correction procedures or make some type of notification to identify the problem.

Using the self-engineering process 100, the MSC 11 can provide a real time inventory of assets. For example, a fleet of vehicles can each be outfitted with a mobile unit. The MSC 11 then maintains an inventory of each vehicle, including its location, that is continually updated. Furthermore, each vehicle can report a condition, or "state". For example, each vehicle could report cargo, fuel, or other conditions.

Yet another application of the MSC 11 and the self-engineering process 100 is to track lost, stolen, or distant items. In one example, the MSC 11 can locate a cellular phone permanently attached to a car in its service area so that the cellular phone can be located. Therefore, if the car becomes stolen, the MSC 11 can find the car by locating the cellular phone. In another example, a remote instrument, such as a surgical scalpel, can be remotely controlled. Do to the ability to achieve very precise location coordinates, a doctor with a mobile unit attached to a first scalpel can move the first scalpel to remotely control a second scalpel. Therefore, working in conjunction with some type of video conferencing, the doctor can instruct or perform remote surgery.

Although illustrative embodiments of the invention have been shown and described, other modifications, changes, and substitutions are intended in the foregoing disclosure. Accordingly, it is appropriate that the appended claims be construed broadly and in a manner consistent with the scope of the invention.

What is claimed is:

1. A method of performing self-engineering in a cellular communication network, the method comprising the steps of receiving a signal indicating a location of a mobile unit, selecting a base station that serves the indicated location, transmitting a code to the mobile unit from the selected base station, and updating an error log according to the mobile unit's response, if any, to the code.

2. The method of claim 1 further comprising using the updated error log to self-engineer the cellular communication network.

3. The method of claim 2 wherein the step of receiving comprises receiving a first identifier code that identifies the mobile unit.

4. The method of claim 3 further comprising storing the indicated location and the first identifier code in a database.

5. The method of claim 4 further comprising analyzing the error log by correlating it to the indicated location and identifier code in the database.

6. The method of claim 1 further comprising analyzing the error log to update a handoff threshold between two base stations of the cellular communication network.

7. The method of claim 1 further comprising analyzing the updated error log and generating a notification signal.

8. In a cellular communication network, a system capable of performing a self-engineering task, the system comprising means for receiving and storing a location code that represents a location of a mobile unit, means for selecting one base station from the cellular communication network to send a signal to the mobile unit, and an error log for storing the mobile unit's response, or lack thereof, to the signal.

9. The system of claim 8 wherein the means for receiving and storing also receives and stores an identifier code.

10. The system of claim 9 further comprising a database for storing the location code and the identifier code.

11. The system of claim 10 further comprising means for analyzing the error log by correlating it to the location code and the identifier code.

12. The system of claim 8 wherein the means for receiving and storing also receives and stores a technology code.

13. The system of claim 8 further comprising means for analyzing the updated error log and selecting a handoff threshold in response thereto.

14. The system of claim 8 further comprising means for analyzing the updated error log and generating a notification signal.

\* \* \* \* \*